United States Patent
Notsu

(10) Patent No.: US 7,305,434 B2
(45) Date of Patent: Dec. 4, 2007

(54) TERMINAL GROUP IMAGE RECOGNITION SYSTEM

(76) Inventor: Risei Notsu, 6-25-2, Nishitsuruma, Yamato-shi, Kanagawa (JP) 242-0005

( * ) Notice: Subject to any disclaimer, the term of this patent is extended or adjusted under 35 U.S.C. 154(b) by 683 days.

(21) Appl. No.: 10/478,287

(22) PCT Filed: May 22, 2002

(86) PCT No.: PCT/JP02/04937

§ 371 (c)(1), (2), (4) Date: Nov. 18, 2003

(87) PCT Pub. No.: WO02/095665

PCT Pub. Date: Nov. 28, 2002

(65) Prior Publication Data

US 2004/0148436 A1      Jul. 29, 2004

(30) Foreign Application Priority Data

May 22, 2001    (JP)    ............................. 2001-153061

(51) Int. Cl.
*G06F 15/16*    (2006.01)
*G06F 15/173*    (2006.01)

(52) U.S. Cl. ...................... 709/203; 709/205; 709/219; 709/223; 715/733; 345/619

(58) Field of Classification Search ................ 709/227, 709/217–226, 228–238, 200–205; 715/733–737; 345/619, 620, 634–636; 707/10, 104.1
See application file for complete search history.

(56) References Cited

U.S. PATENT DOCUMENTS

2003/0035917 A1* 2/2003 Hyman ........................ 428/67

2005/0055641 A1* 3/2005 Machida ...................... 715/734

FOREIGN PATENT DOCUMENTS

| EP | 0 632 375 | 1/1995 |
|---|---|---|
| JP | 61-39656 | 2/1986 |

(Continued)

OTHER PUBLICATIONS

"The Security Entry Service" http://www.sungains.com/entry02.html, retrieved Mar. 28, 2003.

*Primary Examiner*—Haresh Patel
(74) *Attorney, Agent, or Firm*—Merchant & Gould P.C.

(57) ABSTRACT

This invention relates to a system, a server, a method, and a program for recognizing various images including characters and pattern images by using a recognition management server (300) and a second terminal group (200) connected to a first terminal group (100) via a network. It is possible to effectively and reliably recognize a character image and a pattern image which cannot be recognized by the first terminal group alone. The first terminal group (100) inputs an image to be recognized and transmits the image to be recognized to the recognition management server (300). The recognition management server (300) transmits the image to be recognized to the second terminal group (200). The second terminal group (200) receives the image to be recognized and transmits a recognition result corresponding to the image to be recognized, to the recognition management server (300).

5 Claims, 7 Drawing Sheets

FOREIGN PATENT DOCUMENTS

| | | |
|---|---|---|
| JP | 6-309464 | 11/1994 |
| JP | 8-30732 | 2/1996 |
| JP | 8-55183 | 2/1996 |
| JP | 8-95911 | 4/1996 |
| JP | 8-95932 | 4/1996 |
| JP | 9-10698 | 1/1997 |
| JP | 9-62787 | 3/1997 |
| JP | 10-269323 | 10/1998 |
| JP | 10-293813 | 11/1998 |
| JP | 11-250180 | 9/1999 |

* cited by examiner

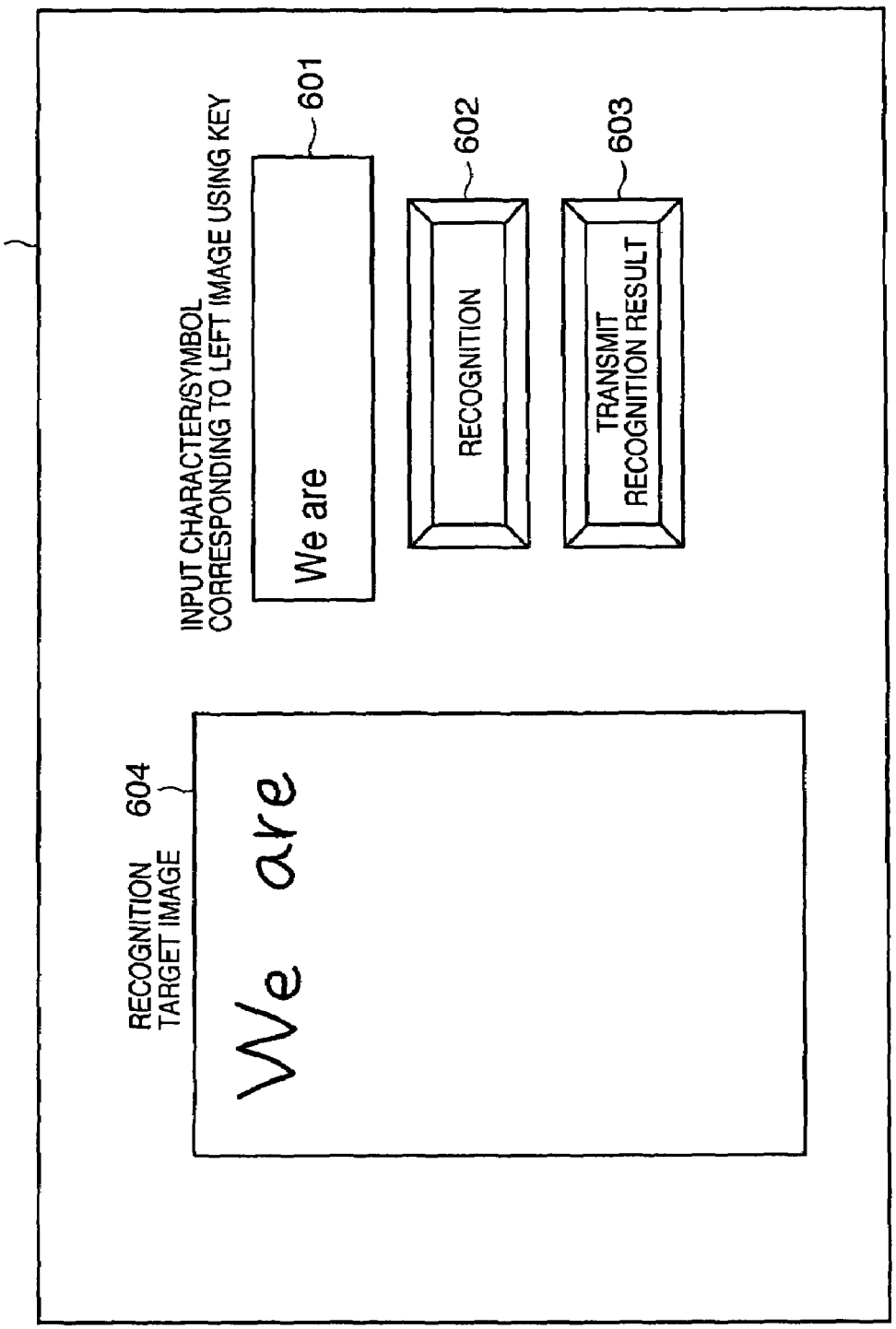

TERMINAL GROUP IMAGE RECOGNITION SYSTEM

CROSS-REFERENCE TO RELATED APPLICATIONS

This application claims the priority of Japan Application No. 2001-153061, filed May 22, 2001 under 35 U.S.C. 119 and PCT Application No. PCT/JP02/04937, filed May 22, 2002 under 35 U.S.C. 371.

TECHNICAL FIELD

The present invention relates to an image recognition system which is formed by connecting a first terminal that inputs an image to be recognized, a recognition management server that manages the image to be recognized and its recognition result, and a second terminal group that recognizes the image to be recognized, via a network, a recognition management server, and its control method and program.

BACKGROUND ART

Today, a recognition process which is implemented by a computer program installed on a terminal such as a personal computer or the like and is used to recognize characters and drawings cannot guarantee 100% recognition. Characters and drawings, which cannot be recognized by the computer program, are recognized by an expert operator either in part or entirely. Hence, the expert operator is required upon executing the recognition process.

However, in operations that require the recognition process, since residence of an expert operator for 24 hours faces many problems in terms of labor regulations and cost, such process is normally executed within limited hours, resulting in poor efficiency. Since recognition process of data which cannot be processed within working hours is executed by a batch process in the next working hours, the processing time is delayed considerably.

The present invention has been made to solve the aforementioned problems, and has as its object to provide an image recognition system, recognition management server, and its control method and program, which can efficiently and reliably execute a recognition process of an image to be recognized.

DISCLOSURE OF INVENTION

In order to achieve the above object, an image recognition system according to the present invention comprises the following arrangement. That is, there is provided an image recognition system which is formed by connecting a first terminal for inputting an image to be recognized, a recognition management server for executing a process associated with recognition of the image to be recognized, and a second terminal group for inputting information corresponding to the image to be recognized via a network, wherein the first terminal comprises:

input means for inputting an image to be recognized; and first communication means for issuing a recognition request of the image to be recognized to the recognition management server, and transmitting the image to be recognized corresponding to the recognition request to the recognition management server, the recognition management server comprises:

second communication means for receiving the image to be recognized corresponding to the recognition request accepted from the first terminal, transmitting the image to be recognized to respective terminals of the second terminal group, and receiving a plurality of types of recognition result corresponding to the image to be recognized from the respective terminals of the second terminal group, and each of the second terminal group comprises:

third communication means for receiving the image to be recognized from the recognition management server, and transmitting a recognition result corresponding to the image to be recognized to the recognition management server; and input means for inputting a recognition result corresponding to the image to be recognized.

Preferably, the recognition management server further comprises:

statistical processing means for applying a statistical process to the plurality of types of recognition result; and management means for storing and managing the image to be recognized and the plurality of types of corresponding recognition results in correspondence with each other in a database, and the management means ranks the plurality of types of recognition result on the basis of a statistical process result of the statistical processing means, and then stores and manages the plurality of types of recognition result in the database in correspondence with the image to be recognized.

Preferably, the statistical processing means applies the statistical process to a plurality of types of recognition-result corresponding to the image to be recognized, which are received from the respective terminals of the second terminal group within a predetermined period of time from a transmission time for the image to be recognized from the second communication means to the respective terminals of the second terminal group.

In order to achieve the above object, a recognition management server according to the present invention comprises the following arrangement. That is, there is provided a recognition management server which connects a first terminal for inputting an image to be recognized, and a second terminal group for inputting information corresponding to the image to be recognized via a network, comprising:

communication means for receiving the image to be recognized corresponding to a recognition request accepted from the first terminal, transmitting the image to be recognized to respective terminals of the second terminal group, and receiving a plurality of types of recognition result corresponding to the image to be recognized from the respective terminals of the second terminal group; and management means for storing and managing the image to be recognized and the plurality of types of corresponding recognition results in correspondence with each other in a database.

Preferably, the recognition management server further comprises statistical processing means for applying a statistical process to the plurality of types of recognition result, and the management means ranks the plurality of types of recognition result on the basis of a statistical process result of the statistical processing means, and then stores and manages the plurality of types of recognition result in the database in correspondence with the image to be recognized.

Preferably, the statistical processing means applies the statistical process to a plurality of types of recognition result corresponding to the image to be recognized, which are received from the respective terminals of the second terminal group within a predetermined period of time from a transmission time for the image to be recognized from the communication means to the respective terminals of the second terminal group.

In order to achieve the above object, a method of controlling a recognition management server according to the present invention comprises the following arrangement. That is, there is provided a method of controlling a recognition management server which connects a first terminal for inputting an image to be recognized, and a second terminal group for inputting information corresponding to the image to be recognized via a network, comprising:

a communication step of receiving the image to be recognized corresponding to a recognition request accepted from the first terminal, transmitting the image to be recognized to respective terminals of the second terminal group, and receiving a plurality of types of recognition result corresponding to the image to be recognized from the respective terminals of the second terminal group; and a management step of storing and managing the image to be recognized and the plurality of types of corresponding recognition results in correspondence with each other in a database.

In order to achieve the above object, a program according to the present invention comprises the following arrangement. That is, there is provided a program for making a computer function to control a recognition management server which connects a first terminal for inputting an image to be recognized, and a second terminal group for inputting information corresponding to the image to be recognized via a network, comprising:

a program code of a communication step of receiving the image to be recognized corresponding to a recognition request accepted from the first terminal, transmitting the image to be recognized to respective terminals of the second terminal group, and receiving a plurality of types of recognition result corresponding to the image to be recognized from the respective terminals of the second terminal group; and a program code of a management step of storing and managing the image to be recognized and the plurality of types of corresponding recognition results in correspondence with each other in a database.

BRIEF DESCRIPTION OF DRAWINGS

FIG. 7 shows an example of a recognition menu according to the embodiment of the present invention.

BEST MODE FOR CARRYING OUT THE INVENTION

A preferred embodiment of the present invention will be described in detail hereinafter with reference to the accompanying drawings.

Figure 1:
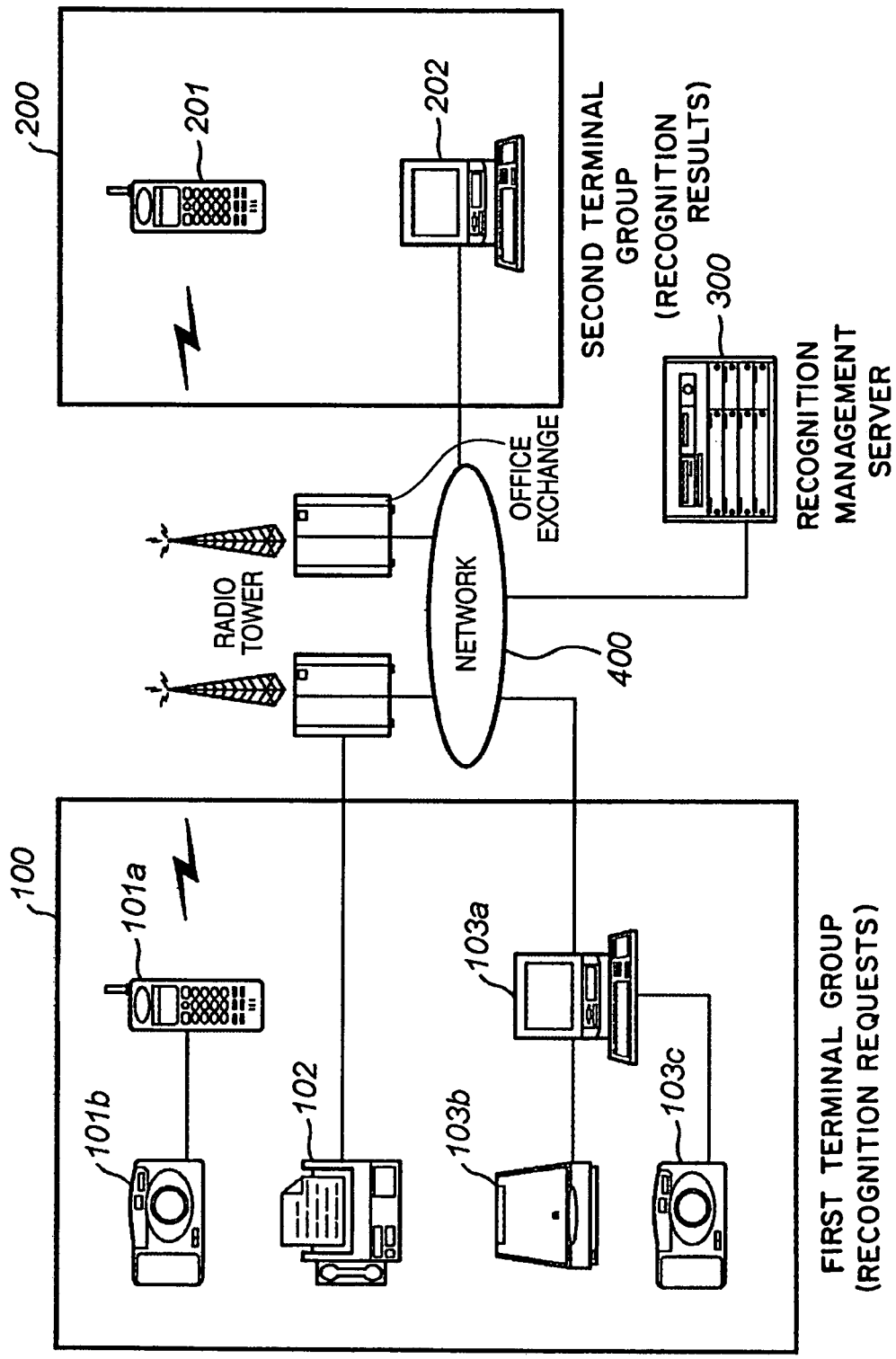
FIG. 1 is a diagram showing the arrangement of an image recognition system according to an embodiment of the present invention.

FIG. 1 shows the arrangement of an image recognition system according to an embodiment of the present invention.

The image recognition system shown in FIG. 1 is formed by interconnecting a first terminal group (used to input images) 100, second terminal group 200, and recognition management server 300 via a network 400.

Note that the network 400 comprises a wide area network (WAN), LAN, Internet, or the like.

Each terminal of the first terminal group 100 inputs an image to be recognized, issues a recognition request of that image to the recognition management server 300, and receives the recognition result of the image to be recognized corresponding to that recognition request from the recognition management server 300. Alternatively, each first terminal may instruct the recognition management server 300 in advance to transfer the recognition result to a processing server (not shown) which is.specialized to execute a post process for the recognition result, in place of receiving the recognition result from the recognition management server 300. Each terminal of the second terminal group 200 recognizes the image to be recognized/inputs information as a recognition result corresponding to the image to be recognized, and transmits the recognition result to the recognition management server 300. The recognition management server 300 accepts a recognition request from each of terminal of the first terminal group 100, transmits a received image to be recognized to the second terminal group 200, receives and collects the recognition results of the image to be received from the second terminal group 200, and transmits the result to the first terminal that issued the recognition request.

As a practical example of the image recognition system of this embodiment, the recognition management server 300 assumes network administrative service providers such as ISP, ASP, and the like. Each terminal of the first terminal group 100 assumes a user/company which uses a service provided by such network administrative service provider. Each terminal of the second terminal group 200 assumes a company/user who supports a service provided by the recognition management server 300. In addition, the service user side and service provider side may agree on exchange of service use fees, and the service provider side and service support side may agree on exchange of service support fees.

As another practical example, the company/user who uses the first terminal may possess the recognition management server 300, and may entrust the network administrative service provider with only its management.

With this arrangement, the company/user who uses the first terminal need only issue a recognition request of an image to be recognized, and is relieved from the recognition work of the image to be recognized, thus improving processing efficiency. The network administrative service provider who manages the recognition management server 300 can introduce a novel service, i.e., can provide a service associated with recognition of an image to be recognized. The company/user who uses each terminal of the second terminal group 300 can do new business, i.e., can provide information that pertains to recognition of an image to be recognized.

In this arrangement, the recognition management server 300 and second terminal group 200 are connected via at least a wide area network.

Note that image recognition in this embodiment includes, e.g., character recognition and pattern (symbols and the like) recognition, and the embodiment to be described below will exemplify a case wherein character recognition is to be made.

The arrangement of the first terminal group 100 will be described below.

The first terminal group 100 includes a portable phone which mounts or is connected with an image camera such as a digital camera, digital video camera, or the like, a facsimile apparatus, a personal computer which mounts or is connected with an image scanner/image camera, a FAX type Internet terminal which can exchange FAX data and can establish network connection, a video phone type Internet terminal which allows a video phone, and the like, and is not particularly limited as long as it is a terminal which can input a character image to be recognized.

FIG. 1 shows, as the first terminal group 100, a portable phone 101a to which an image camera 101b is connected, a facsimile apparatus 102, and a personal computer 103a to which an image scanner 103b/image camera 103c are connected.

The portable phone 101a to which the image camera 101b is connected inputs a character image to be recognized from the connected image camera 101b, and transmits the input character image to be recognized to the recognition management server 300.

The facsimile apparatus 102 scans a character image to be recognized, and transmits the scanned character image to the recognition management server 300.

The personal computer 103a to which the image scanner 103b/image camera 103c are connected inputs a character image to be recognized from the image scanner 103b/image camera 103c, and transmits the input character image to the recognition management server 300.

Note that the personal computer 103a transmits a character image to be recognized using a protocol that allows transmission on the Internet such as FTP transmission, HTTP transmission via a browser, and the like.

In the first terminal group 100, the portable phone 101a and facsimile apparatus 102 directly transmit input images (image type 1) to the recognition management server 300.

On the other hand, a terminal having an image processing function such as the personal computer 103a or the like selects and extracts partial images required for recognition from a character image on the terminal, and transmits the extracted partial images (image type 2) to the recognition management server 300.

In addition, when a terminal having a character recognition function such as the personal computer 103a or the like cannot recognize a character image/partial images to be recognized, it transmits the character image/partial images (image type 3) to the recognition management server.

Note that the image processing function and character recognition function of the terminal such as the personal computer 103a or the like are implemented as dedicated hardware or programs which run on the terminal. Especially, when such functions are implemented as programs, it is done by installing, on the terminal, programs stored in a storage medium such as a CD-ROM or the like via an external storage device such as a CD-ROM drive device or the like, which is equipped in the terminal. Alternatively, the recognition management server 300 manages programs, which are downloaded as needed via the network 400, thereby implementing the above functions.

If security, data transfer efficiency, or the like must be assured, a character image to be recognized may be transmitted to the recognition management server 300 after it undergoes an encryption process or data compression process.

The arrangement of the second terminal group 200 will be described below.

The second terminal group 200 includes a personal computer, a portable phone which mounts or is connected with a display device, a video phone type Internet terminal, and the like, and is not particularly limited as long as it is a terminal which can achieve character recognition of a character image or can input a character.

FIG. 1 shows a portable phone 201 and personal computer 202 as the second terminal group 200.

The portable phone 201 receives a character image to be recognized from the recognition management server 300, and inputs a character recognition result of that character image by making a user's input operation of a character code as the character recognition result corresponding to the character image. The portable phone 201 transmits the input character recognition result to the recognition management server 300.

The personal computer 202 receives a character image to be recognized from the recognition management server 300, and inputs a character recognition result of that character image by executing a character recognition process for that image or by making a user's input operation of a character code as the character recognition result corresponding to the image. Then, the personal computer 202 transmits the acquired character recognition result to the recognition management server 300.

Note that the portable phone 201 and personal computer 202 receive the character image to be recognized and transmit the character recognition result using a protocol that allows transmission on the Internet such as FTP transmission, HTTP transmission via a browser, and the like.

When the second terminal group 200 has a character recognition function, that function is implemented as dedicated hardware or a program which runs on the terminal. The function is implemented by installing, on the terminal, a program stored in a storage medium such as a CD-ROM or the like via an external storage device such as a CD-ROM drive-device or the like, which is equipped in the terminal. Alternatively, the recognition management server 300 manages a program, which is downloaded as needed via the network 400, thereby implementing the above functions.

If security, data transfer efficiency, or the like must be assured, a character recognition result may be transmitted to the recognition management server 300 after it undergoes an encryption process or data compression process.

The arrangement of the recognition management server 300 will be described below.

The recognition management server 300 has a database function of receiving and saving character images to be recognized, which are transmitted from the first terminal group 100 via the network 400.

This database function includes an index assignment function including various parameters used to specify a character image to be recognized.

The recognition management server 300 executes a pre-process (a selection/extraction function and character recognition function) of a character image to be recognized on the basis of the data type (image type 1, 2, or 3) of that character image to be recognized. This pre-process is done to average different functions and levels of the respective terminals of the first terminal group 100. After completion of the pre-process, the recognition management server 300 transmits the character image to be recognized to the second terminal group 200.

If security, data transfer efficiency, or the like must be assured, a character image may be transmitted to the second terminal group 200 after it undergoes an encryption process or data compression process.

Upon reception of the character recognition results of the character image to be recognized from respective terminals of the second terminal group 200, the recognition management server 300 collects the character recognition results and executes a statistical process, and then ranks character recognition result candidates of the character image to be recognized on the basis of the statistical process result. These character recognition result candidates are stored in a database in correspondence with the character image to be recognized.

The functional arrangement of the image recognition system of this embodiment will be described below using FIG. 2.

Figure 2:
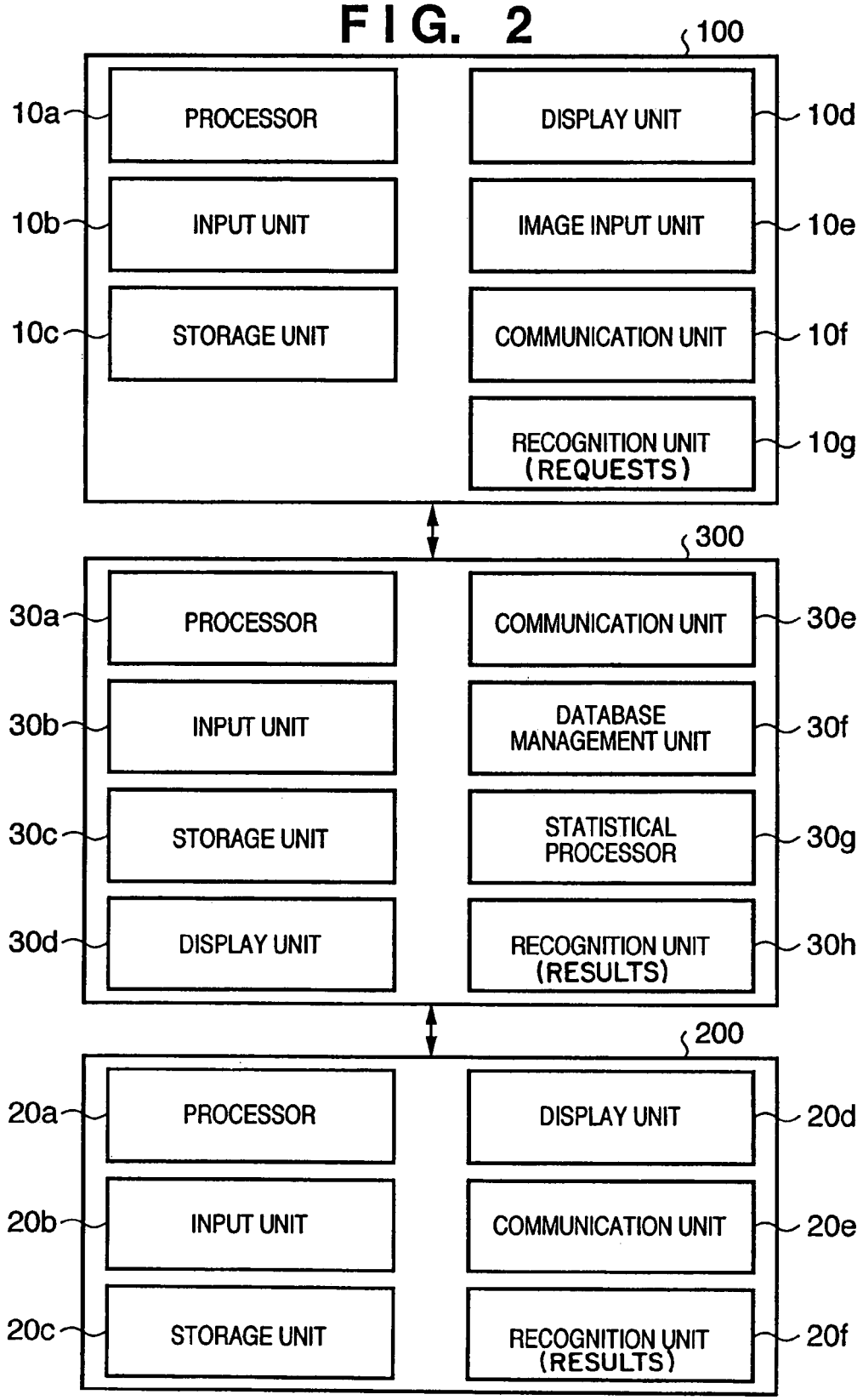
FIG. 2 is a block diagram showing the functional arrangement of the image recognition system according to the embodiment of the present invention.

FIG. 2 shows the functional arrangement of the image recognition system of this embodiment.

In the first terminal group 100, reference numeral 10a denotes a processor, which is implemented by a CPU and executes various processes including a process for executing the flow chart of FIG. 3 to be described later. Reference numeral 10b denotes an input unit, which is implemented by a keyboard and pointing device, and makes various inputs such as execution instructions of various processes to be executed by the first terminal group 100 and the like. Reference numeral 10c denotes a storage unit, which is implemented by a RAM, ROM, or internal storage medium, serves as a work area/temporary storage area of various data, and stores various programs and various data required to implement the various processes. Reference numeral 10d denotes a display unit, which is implemented by a CRT or LCD, and displays processing states of various processes to be executed by the first terminal group 100 and various GUIs (graphic user interfaces). Reference numeral 10e denotes an image input unit, which is implemented by the aforementioned image camera or image scanner, and inputs an image to be recognized. Reference numeral 10f denotes a communication unit, which is implemented by a modem or network interface, and exchanges data with the recognition management server 300. Reference numeral 10g denotes a recognition unit, which recognizes the input image to be recognized.

In the recognition management server 300, reference numeral 30a denotes a processor, which is implemented by a CPU and executes various processes including a process for executing the flow chart of FIG. 5 to be described later. Reference numeral 30b denotes an input unit, which is implemented by a keyboard and pointing device, and makes various inputs such as execution instructions of various processes to be executed by the recognition management server 300 and the like. Reference numeral 30c denotes a storage unit, which is implemented by a RAM, ROM, or internal storage medium, serves as a work area/temporary storage area of various data, and stores various programs and various data required to implement the various processes. Reference numeral 30d denotes a display unit, which is implemented by a CRT or LCD, and displays processing states of various processes to be automatically executed by the recognition management server 300 and various GUIs (graphic user interfaces). Reference numeral 30e denotes a communication unit, which is implemented by a modem or network interface, and exchanges data with the first and second terminal groups 100 and 200. Reference numeral 30f denotes a database management unit, which manages data registration access, lookup access, and the like to a database assured on the storage unit 30c. Reference numeral 30g denotes a statistical processor, which executes a statistical process by collecting recognition results received from the second terminal group 200. Reference numeral 30h denotes a recognition unit which recognizes an image to be recognized received from the first terminal group 100.

In the second terminal group 200, reference numeral 20a denotes a processor, which is implemented by a CPU and executes various processes including a process for executing the flow chart of FIG. 4 to be described later. Reference numeral 20b denotes an input unit, which is implemented by a keyboard and pointing device, and makes various inputs such as execution instructions of various processes to be executed by the second terminal group 200 and the like. Reference numeral 20c denotes a storage unit, which is implemented by a RAM, ROM, or internal storage medium, serves as a work area/temporary storage area of various data, and stores various programs and various data required to implement the various processes. Reference numeral 20d denotes a display unit, which is implemented by a CRT or LCD, and displays processing states of various processes to be executed by the second terminal group 200 and various GUIs (graphic user interfaces). Reference numeral 20e denotes a communication unit, which is implemented by a modem or network interface, and exchanges data with the recognition management server 300. Reference numeral 20f denotes a recognition unit which recognizes an image to be recognized received from the recognition management server 300.

The processes to be executed by the aforementioned terminals will be explained below.

The process to be executed by each terminal of the first terminal group 100 will be explained below using FIG. 3.

Figure 3:
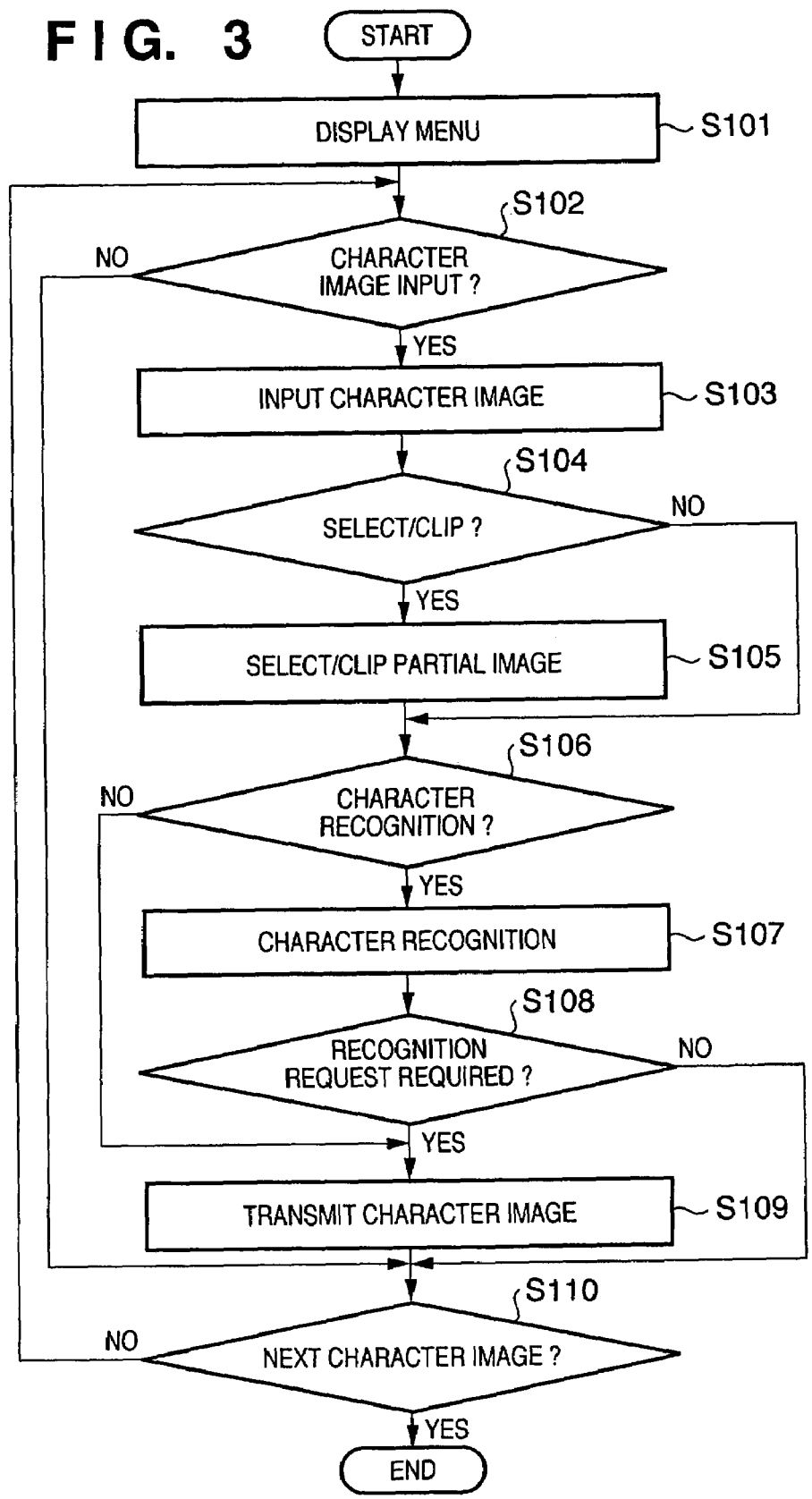
FIG. 3 is a flow chart showing the process to be executed by a first terminal according to the embodiment of the present invention.

FIG. 3 is a flow chart showing the process to be executed by the first terminal of this embodiment.

Note that FIG. 3 will exemplify the personal computer 103a as the first terminal group 100.

In step S101, the personal computer 103a displays an image input menu used to input a character image to be recognized. It is checked in step S102 if a character image is input using the displayed image input menu. If no character image is input (NO in step S102), the flow jumps to step S110. On the other hand, if a character image is input (YES in step S102), the flow advances to step S103.

An example of the image input menu will be described below using FIG. 6.

Figure 6:
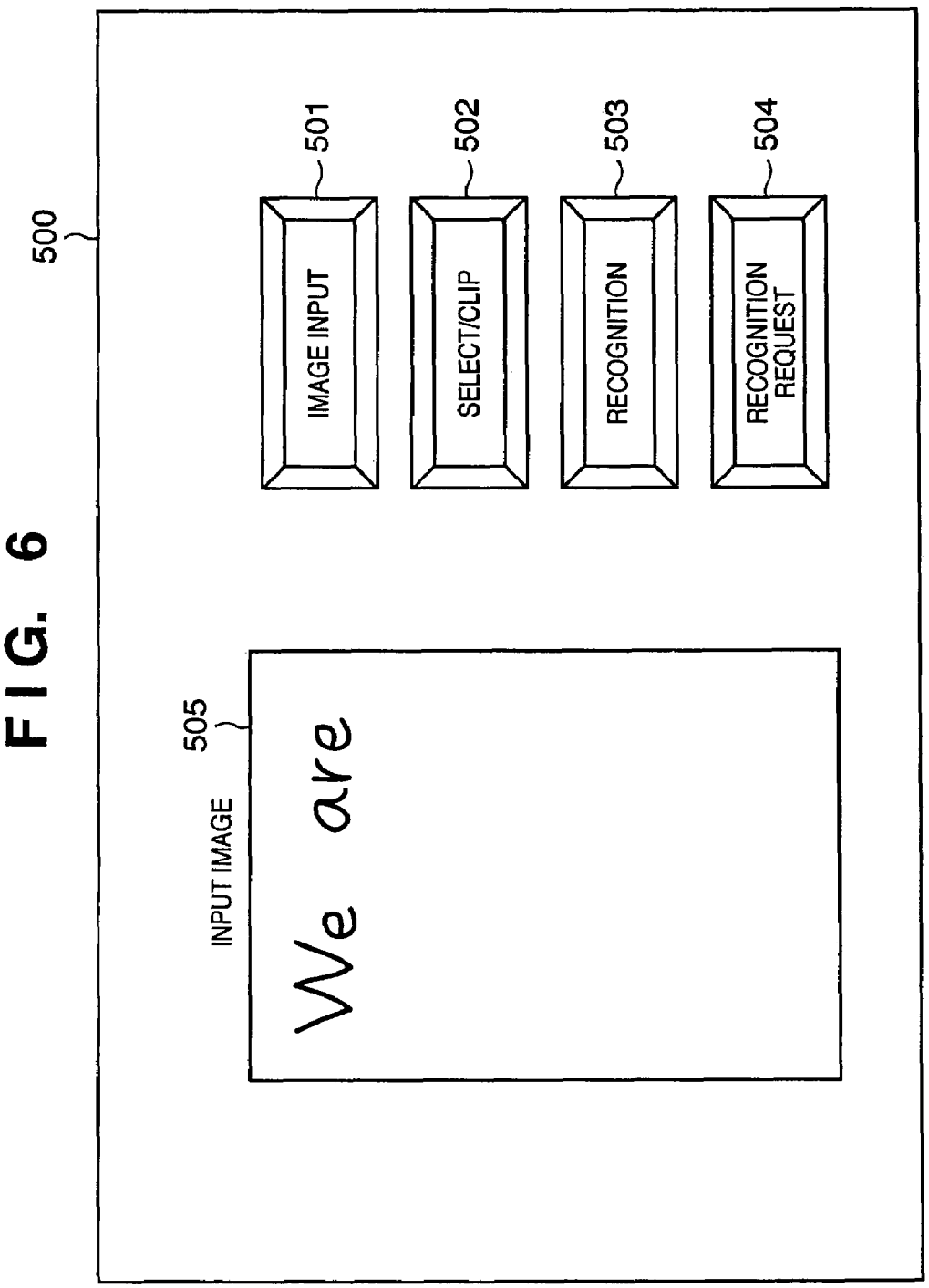
FIG. 6 shows an example of an image input menu according to the embodiment of the present invention.

FIG. 6 shows an example of the image input menu of this embodiment.

On an image input menu 500 in FIG. 6, reference numeral 501 denotes an image input button used to input an image to be recognized. Upon depression of this button, an input operation of an image to be recognized is executed, and the input image to be recognized is displayed on an image display area 505. Reference numeral 502 denotes a select/clip button used to select/clip a desired partial image from the image to be recognized displayed on the input image display area 505. Upon depression of this button, a select/clip tool used to select/clip a desired partial image from the image to be recognized displayed on the input image display are 505 is displayed, and the user can select/clip a desired partial image using this select/clip tool. Reference numeral

503 denotes a recognition button used to recognize the image to be recognized displayed on the input image display area 505. Upon depression of this button, the image/partial image to be recognized displayed on the input image display area 505 is recognized. Reference number 504 denotes a recognition request button used to issue a recognition request of the image/partial image to be recognized displayed on the input image display area 505. Upon depression of this button, a recognition request of the image/partial image to be recognized is issued to the recognition management server 300, and that image/partial image is transmitted to the recognition management server 300.

The description will revert to FIG. 3.

In step S103, a character image is input using the image scanner 103b/image camera 103c connected to the personal computer 103a. It is checked in step S104 if a partial image is to be selected/clipped from the input character image. If no partial image is to be selected/clipped (NO in step S104), the flow jumps to step S106. On the other hand, if a partial image is to be selected/clipped (YES in step S104), the flow advances to step S105.

In step S105, a desired partial image is selected/clipped from the input character image. It is checked in step S106 if the input character image or partial image is to undergo character recognition. If character recognition is to be skipped (NO in step S106), the flow jumps to step S109. On the other hand, if character recognition is to be executed (YES in step S106), the flow advances to step S107.

In step S107, the input character image or partial image undergoes character recognition. It is checked in step S108 if a recognition request of the input character image or partial image is to be issued to the second terminal 200 when no character recognition result is obtained. If no request is to be issued (NO in step S108), the flow jumps to step S110. If a request is to be issued (YES in step S108), the flow advances to step S109.

In step S109, a recognition request of the input character image or partial image is issued to the recognition management server 300, and the character image or partial image is transmitted to the recognition management server 300. In this case, index data used to specify the input character image or partial image is appended. It is checked in step S110 if the next character image to be processed still remains. If the next character image to be processed still remains (YES in step S110), the flow returns to step S102. On the other hand, if no character image to be processed remains (NO in step S110), the process ends.

Note that FIG. 3 has exemplified the process to be executed by the personal computer 103a. Since the aforementioned portable phone 101a or facsimile apparatus 102 does not normally have processing functions described in steps S105 and S107, these steps are skipped as needed.

The process to be executed by each terminal of the second terminal group 200 will be described below using FIG. 4.

Figure 4:
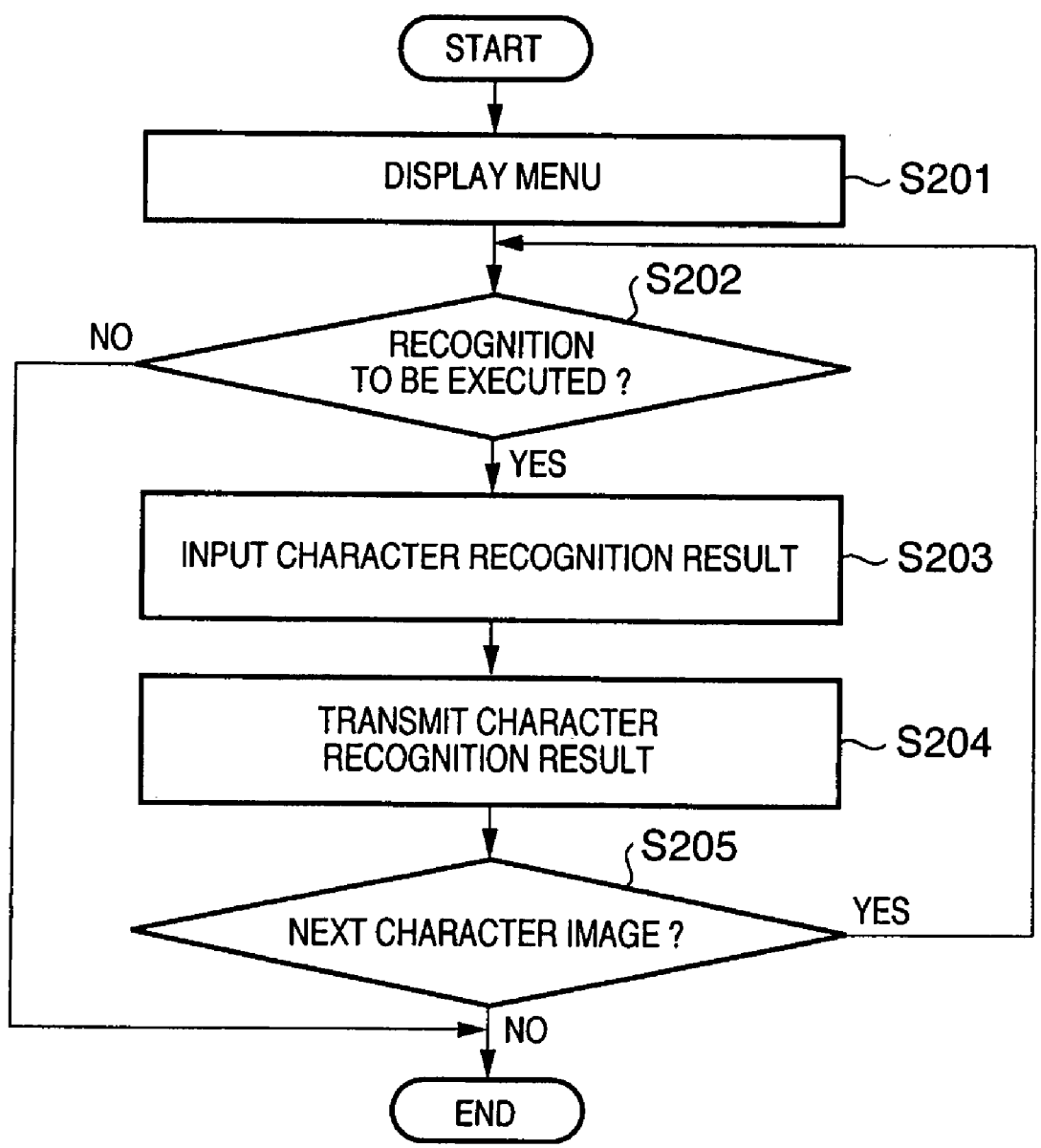
FIG. 4 is a flow chart showing the process to be executed by each terminal of a second terminal group according to the embodiment of the present invention.

FIG. 4 is a flow chart showing the process to be executed by each terminal of the second terminal group of this embodiment.

When each terminal of the second terminal group 200 receives a character image to be recognized corresponding to the request from the personal computer 103a via the recognition-management server 300, it displays a recognition menu used to input a character code corresponding to the character image to be recognized in step S201. It is checked in step S202 if character recognition corresponding to the character image is to be executed using the displayed recognition menu. If no character recognition is to be executed (NO in step S202), the process ends. If character recognition is to be executed (YES in step S202), the flow advances to step S203.

An example of the recognition menu will be described below using FIG. 7.

FIG. 7 shows an example of the recognition menu of this embodiment.

On an image recognition menu 600 in FIG. 7, reference numeral 604 denotes a recognition target image display area for displaying the image to be recognized received from the recognition management server 300. Reference numeral 601 denotes a recognition result input area used to input a character (or code) corresponding to the image to be recognized by a user's key input. Reference numeral 602 denotes a recognition button used to recognize the image to be recognized displayed on the recognition target image display area 604. Upon depression of this button, the image to be recognized displayed on the recognition target image display area 604 is recognized, and a code as its recognition result is input to the recognition result input area 601. Reference numeral 603 denotes a recognition result transmission button used to transmit the recognition result of the image to be recognized input to the recognition result input area 601 to the recognition management server 300.

The description will revert to FIG. 4.

In step S203, the character image to be recognized undergoes character recognition, or the user inputs a corresponding character code. In step S204, the recognized or input character code is transmitted to the recognition management server 300 as a character recognition result. It is checked in step S205 if the next character image to be processed still remains. If the next character image to be processed still remains (YES in step S205), the flow returns to step S202. On the other hand, if no character image to be processed remains (NO in step S205), the process ends.

The process to be executed by the recognition management server 300 will be described below using FIG. 5.

Figure 5:
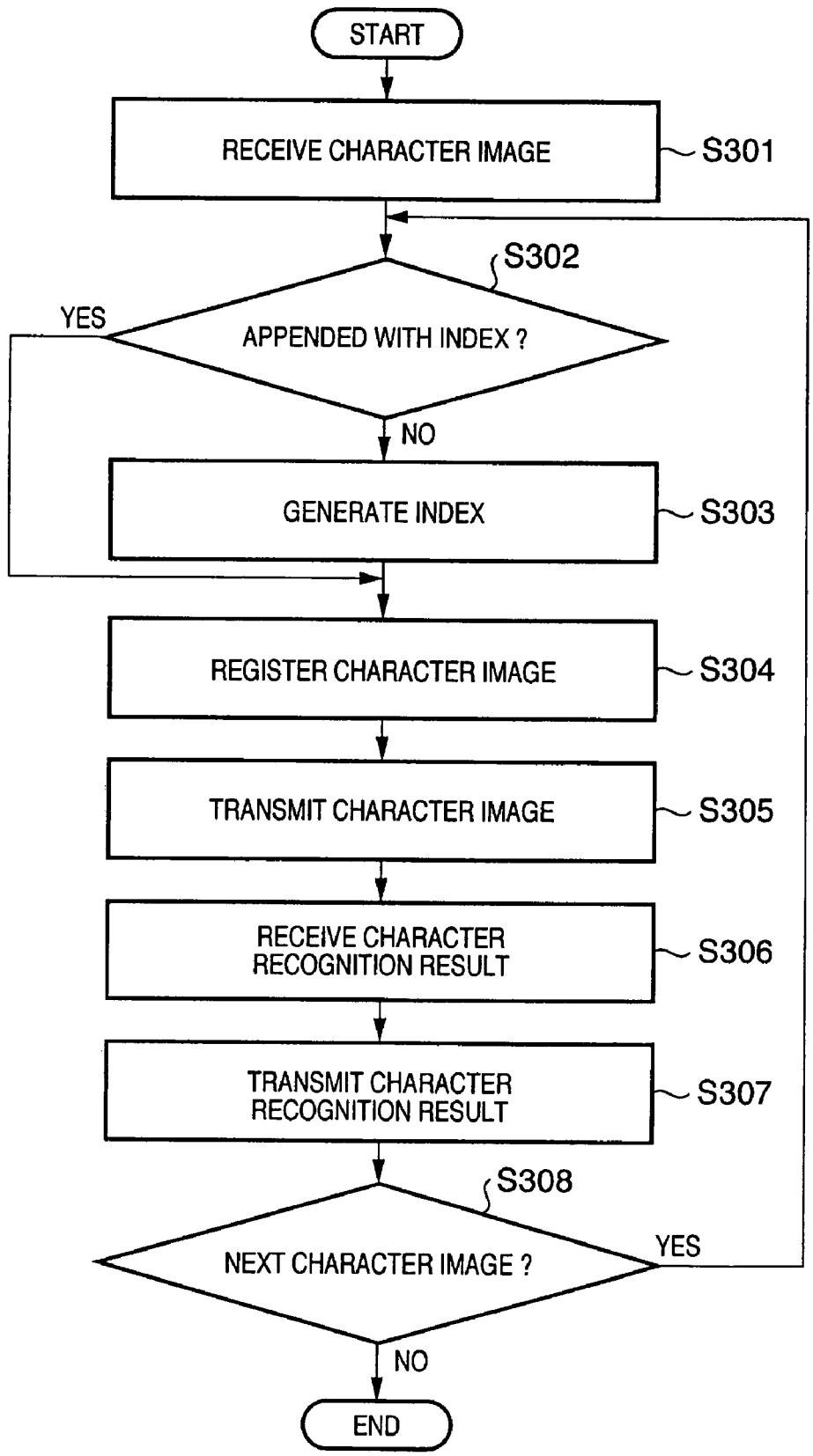
FIG. 5 is a flow chart showing the process to be executed by a recognition management server according to the embodiment of the present invention.

FIG. 5 is a flow chart showing the process to be executed by the recognition management server 300 of this embodiment.

In step S301, the character image to be recognized is received from the personal computer 103a. It is checked in step S302 if index data is appended to the received character image to be recognized. If index data is appended (YES in step S302), the flow jumps to step S304. On the other hand, if no index data is appended (NO in step S302), the flow advances to step S303 to generate index data which specifies that character image to be recognized, and to append the index data to the character image.

In step S304, the character image appended with the index data is registered in the database. In step S305, the character image is transmitted to the second terminal group 200 which can currently perform character recognition. That is, the character image is transmitted to the second terminal group 200 which can currently receive the character image.

Note that the second terminal group 200 that can perform character recognition is determined in such a manner that second terminal information that pertains to each second terminal such as the operating state of the second terminal group 200, the receivable time band of a character image, and the like is registered in advance in the recognition management server 300, which determines the second terminal group as a destination of the character image on the basis of the second terminal information.

In step S306, a plurality of types of character recognition results corresponding to the transmitted character image are received from respective terminals of the second terminal group 200, and are stored in the database in correspondence with the corresponding character image.

In step S307, the plurality of types of received character recognition results are collected and undergo a statistical process, and character recognition result candidates are ranked on the basis of the statistical process result. Then, the character recognition results are transmitted to the personal computer 103a. In order to improve the processing efficiency, only a character recognition result candidate of the first rank or those of the first to third ranks may be transmitted to the personal computer 103a in place of transmitting all the character recognition candidates to the personal computer 103a. In this embodiment, the character recognition results are transmitted to the first terminal 100. Alternatively, the recognition results may be managed on the recognition management server 300, which may serve as a file server that allows the first terminal to freely access these recognition results. Furthermore, when the image to be recognized corresponding to the recognition request from the first terminal 100 is a slip, form, or the like, and requires a post process for recognition results including an accounting process, the recognition management server 300 may execute the post process for the recognition results of the image. Or a processing server (not shown) which exclusively executes a post process for the recognition results of an image and can be accessed by the first terminal may be built, and the recognition results of the image may be transferred to that processing server, which may execute the post process.

Note that the statistical process ranks character recognition candidates by, e.g., simply determining the most character recognition results as the first character recognition candidate, the second most character recognition results as the second character recognition candidate, and so forth. As for the execution timing of the statistical process, a plurality of types of character recognition results which are received within a predetermined period of time from the transmission time for the character image to the second terminal group 200 undergo the statistical process.

It is checked in step S308 if the next character image to be processed still remains. If the next character image to be processed still remains (YES in step S308), the flow returns to step S302. On the other hand, if no character image to be processed remains (NO in step S308), the process ends.

As described above, according to this embodiment, recognition requests of various images including character images and pattern images, which cannot be recognized by a recognition program installed on the first terminal group 100, are issued to the recognition management server 300, which transmits an image to be recognized corresponding to the accepted recognition request to the second terminal group 200. The recognition management server 300 collects the recognition results of the image to be recognized input by the second terminal group 200, executes a statistical process, and ranks the character recognition result candidates on the basis of the statistical process result. Then, the recognition management server 300 transmits the character recognition results to the first terminal group 100.

With this arrangement, 100% recognition ratio can be achieved as well as character images and pattern images, which cannot be recognized by a computer program, and residence of an expert operator for 24 hours is not required, thus allowing real-time processes.

By utilizing a network, processes can be distributed to a broad area, and human resources (those who are at home and on the move) can be effectively used.

Note that the present invention can also be achieved by supplying a storage medium that records a program code for implementing the flow charts of the above embodiment to each terminal, and executing a program code stored in that storage medium.

As described above, according to the present invention, an image recognition system, recognition management server, and its control method and program, which can efficiently and reliably execute the recognition process of an image to be recognized, can be provided.

The invention claimed is:

1. An image recognition system comprising a first terminal group for inputting an image to be recognized, a recognition management server for executing a process associated with a first recognition result corresponding to the image to be recognized, and a second terminal group for recognizing said image and transmitting a first recognition result corresponding to said image to the recognition management server, wherein said first terminal group and said second terminal group are connected to each other via a network, comprising:

each terminal of said first terminal group, which is used by a first user utilizing an image selection process, comprises:

first input means for inputting an image to be recognized; and first transmission means for issuing a recognition request for the image to be recognized to said recognition management server, and transmitting said image to said recognition management server with one of three image types;

said recognition management server comprises:

first reception means for receiving the image to be recognized;

first processing means for applying an image process to said image;

first determination means for determining one or more destination second terminals from the second terminal group to which said image is transmitted, based on second terminal information relating to each terminal of the second terminal group;

second transmission means for transmitting the image processed by said first processing means to each of said destination second terminals;

second reception means for receiving a plurality of types of first recognition results corresponding to the image processed by said first processing means from each of said destination second terminals;

second processing means for determining a second recognition result for the image processed by said first processing means, based on the plurality of types of first recognition results;

third transmission means for transmitting said second recognition result to the terminal in the first terminal group that issued the recognition request;

statistical processing means for applying a statistical process to the plurality of types of first recognition results corresponding to the image processed by said first processing means, which are received from the respective terminals of said second terminal group within a predetermined period of time after a transmission time for the image processed by said first processing means to the respective terminals of said second terminal group; and management means for storing and managing the image processed by said statistical processing means and said plurality of types of first recognition results in correspondence with each other in a database, said management means ranks said plurality of types of first recognition results on the basis of a statistical process result of said statistical processing means, and then stores and manages said plurality of types of first recognition results in the database in correspondence with the image processed by said first processing means;

each terminal of said second terminal group, which is used by a second user and which supports an image recognition process comprises:

third reception means for receiving the image processed by said first processing means from said recognition management server;

image recognition processing means by which said second user recognizes said image processed by said first processing means;

input means for inputting a first recognition result corresponding to said recognized image; and fourth transmission means for transmitting said first recognition result to said recognition management server.

2. The system according to claim 1, wherein each terminal of said first terminal group further comprises first reception means for receiving the second recognition result corresponding to the image to be recognized from said recognition management server or other server.

3. A recognition management server which connects a first terminal group for inputting an image to be recognized, and a second terminal group for recognizing said image and transmitting a first recognition result corresponding to said image to be recognized via a network, comprising:

first reception means for receiving the image to be recognized;

first processing means for applying an image process to said image;

first determination means for determining one or more destination second terminals from the second terminal group to which said image is transmitted, based on second terminal information relating to each terminal of the second terminal group;

second transmission means for transmitting the image processed by said first processing means to each of said destination second terminals;

second reception means for receiving a plurality of types of first recognition results corresponding to the image processed by said first processing means from each of said destination second terminals;

second processing means for determining a second recognition result for the image processed by said first processing means, based on the plurality of types of first recognition results third transmission means for transmitting said second recognition result to the terminal in the first terminal group that issued the recognition request;

statistical processing means for applying a statistical process to the plurality of types of first recognition results corresponding to the image processed by said first processing means, which are received from the respective terminals of said second terminal group within a predetermined period of time after a transmission time for the image processed by said first processing means to the respective terminals of said second terminal group; and management means for storing and managing the image processed by said statistical processing means and said plurality of types of first recognition results in correspondence with each other in a database, said management means ranks said plurality of types of first recognition results on the basis of a statistical process result of said statistical processing means, and then stores and manages said plurality of types of first recognition results in the database in correspondence with the image processed by said first processing means;

each terminal of said first terminal group, which is used by a first user utilizing an image selection process, comprises:

first input means for inputting an image to be recognized; and first transmission means for issuing a recognition request for the image to be recognized to said recognition management server, and transmitting said image to said recognition management server with one of three image types;

each terminal of said second terminal group, which is used by a second user and which supports an image recognition process comprises:

third reception means for receiving the image processed by said first processing means from said recognition management server;

image recognition processing means by which said second user recognizes said image processed by said first processing means;

input means for inputting a first recognition result corresponding to said recognized image; and fourth transmission means for transmitting said first recognition result to said recognition management server.

4. A method of controlling a recognition management server which connects a first terminal group for inputting an image to be recognized, and a second terminal group for recognizing said image and transmitting a first recognition result corresponding to the image to be recognized via a network, comprising steps of:

receiving the image to be recognized, by first reception means;

applying an image process to said image, by first processing means;

determining one or more destination second terminals, by first determination means, from the second terminal group to which said image is transmitted, based on second terminal information relating to each terminal of the second terminal group;

transmitting the image, by second transmission means, processed by said first processing means to each of said destination second terminals;

receiving a plurality of types of first recognition results, by second reception means, corresponding to the image processed by said first processing means from each of said destination second terminals;

determining a second recognition result, by second processing means, for the image processed by said first processing means, based on the plurality of types of first recognition results transmitting said second recognition result, by third transmission means, to the terminal in the first terminal group that issued the recognition request;

applying a statistical process, by statistical processing means, to the plurality of types of first recognition results corresponding to the image processed by said first processing means, which are received from the respective terminals of said second terminal group within a predetermined period of time after a transmission time for the image processed by said first processing means to the respective terminals of said second terminal group; and storing and managing, by management means, the image processed by said statistical processing means and said plurality of types of first recognition results in correspondence with each other in a database, said management means ranks said plurality of types of first recognition results on the basis of a statistical process result of said statistical processing means, and then stores and manages said plurality of types of first recognition results in the database in correspondence with the image processed by said first processing means;

each terminal of said first terminal group, which is used by a first user utilizing an image selection process, comprises:

first input means for inputting an image to be recognized; and first transmission means for issuing a recognition request for the image to be recognized to said recognition management server, and transmitting said image to said recognition management server with one of three image types;

each terminal of said second terminal, group, which is used by a second user and which supports an image recognition process comprises:

third reception means for receiving the image processed by said first processing means from said recognition management server;

image recognition processing means by which said second user recognizes said image processed by said first processing means;

input means for inputting a first recognition result corresponding to said recognized image; and fourth transmission means for transmitting said first recognition result to said recognition management server.

5. A program stored in hard drive of a computer for making a computer function to control a recognition management server which connects a first terminal group for inputting an image to be recognized, and a second terminal group for recognizing said image and transmitting a first recognition result corresponding to the image to be recognized via a network, comprising:

a program code stored in said hard drive of receiving the image to be recognized, by first reception means;

a program code stored in said hard drive of applying an image process to said image, by first processing means;

a program code stored in said hard drive of determining one or more destination second terminals, by first determination means, from the second terminal group to which said image is transmitted, based on second terminal information relating to each terminal of the second terminal group;

a program code stored in said hard drive of transmitting the image, by second transmission means, processed by said first processing means to each of said destination second terminals;

a program code stored in said hard drive of receiving a plurality of types of first recognition results, by second reception means, corresponding to the image processed by said first processing means from each of said destination second terminals;

a program code stored in said hard drive of determining a second recognition result, by second processing means, for the image processed by said first processing means, based on the plurality of types of first recognition results a program code stored in said hard drive of transmitting said second recognition result, by third transmission means, to the terminal in the first terminal group that issued the recognition request;

a program code stored in said hard drive of applying a statistical process, by statistical processing means, to the plurality of types of first recognition results corresponding to the image processed by said first processing means, which are received from the respective terminals of said second terminal group within a predetermined period of time after a transmission time for the image processed by said first processing means to the respective terminals of said second terminal group; and a program code stored in said hard drive, of storing and managing, by management means, the image processed by said statistical processing means and the plurality of types of first recognition results in correspondence with each other in a database, said management means ranks said plurality of types of first recognition results on the basis of a statistical process result of said statistical processing means, and then stores and manages said plurality of types of first recognition results in the database in correspondence with the image processed by said first processing means;

each terminal of said first terminal group, which is used by a first user utilizing an image selection process, comprises:

first input means for inputting an image to be recognized; and first transmission means for issuing a recognition request for the image to be recognized to said recognition management server, and transmitting said image to said recognition management server with one of three image types;

each terminal of said second terminal group, which is used by a second user and which supports an image recognition process comprises:

third reception means for receiving the image processed by said first processing means from said recognition management server;

image recognition processing means by which said second user recognizes said image processed by said first processing means, input means for inputting a first recognition result corresponding to said recognized image; and fourth transmission means for transmitting said first recognition result to said recognition management server.

* * * * *